(12) United States Patent
Cho et al.

(10) Patent No.: US 8,451,893 B2
(45) Date of Patent: May 28, 2013

(54) APPARATUS AND METHOD FOR CODING AND DECODING IMAGE

(75) Inventors: Daesung Cho, Seoul (KR); Hyun Mun Kim, Seongnam-si (KR); Wooshik Kim, Yongin-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1670 days.

(21) Appl. No.: 11/517,267

(22) Filed: Sep. 8, 2006

(65) Prior Publication Data

US 2007/0064795 A1   Mar. 22, 2007

(30) Foreign Application Priority Data

Sep. 9, 2005   (KR) .................. 10-2005-0084250

(51) Int. Cl.
*H04N 7/12* (2006.01)
(52) U.S. Cl.
USPC ...................................... 375/240.12
(58) Field of Classification Search
USPC ...................................... 375/240.12
See application file for complete search history.

(56) References Cited

U.S. PATENT DOCUMENTS

| | | | | |
|---|---|---|---|---|
| 5,565,921 A * | 10/1996 | Sasaki et al. | ............. | 375/240.13 |
| 5,926,224 A * | 7/1999 | Nagasawa | ................. | 375/240.14 |
| 6,243,497 B1 * | 6/2001 | Chiang et al. | ................. | 382/251 |
| 6,272,177 B1 * | 8/2001 | Murakami et al. | ........ | 375/240.03 |
| 6,281,942 B1 * | 8/2001 | Wang | ............................. | 348/607 |
| 6,658,618 B1 * | 12/2003 | Gu et al. | ......................... | 714/746 |
| 2004/0028282 A1 * | 2/2004 | Kato et al. | .................... | 382/236 |
| 2004/0076237 A1 * | 4/2004 | Kadono et al. | ........... | 375/240.29 |
| 2006/0023794 A1 * | 2/2006 | Wan et al. | ................ | 375/240.29 |
| 2007/0025447 A1 * | 2/2007 | Kojokaro et al. | ........ | 375/240.24 |

FOREIGN PATENT DOCUMENTS

| | | |
|---|---|---|
| JP | 09-289642 | 4/1997 |
| JP | 09-307894 | 11/1997 |
| JP | 2002-271798 | 9/2002 |
| JP | 2003-125409 | 4/2003 |
| JP | 2003-125410 | 4/2003 |
| KR | 2003-0049140 A | 6/2003 |
| KR | 2004-0099560 A | 12/2004 |

OTHER PUBLICATIONS

Gary Sullivan et al., "Draft Text of H.264/AVC Fidelity Range Extensions Amendment", Joint Video Team (JVT) of ISO/IEC MPEG & ITU-T VCEG (ISO/IEC JTC1/SC29/WG11 and ITU-T SG16 Q.6), 12th Meeting: Redmond, WA, Jul. 17-23, 2004, 136 pgs. including title, i-iv, and 1-127.

* cited by examiner

*Primary Examiner* — Mehrdad Dastouri
*Assistant Examiner* — Mohammed Rahaman
(74) *Attorney, Agent, or Firm* — Staas & Halsey LLP

(57) ABSTRACT

An apparatus and method for coding and decoding an image are provided. The apparatus for coding the image includes a spatio-temporal information prediction/compensation unit, a recovered image processor, a residue generator, a quantizer, and an entropy encoder. The spatio-temporal information prediction/compensation unit generates a predicted image by predicting and compensating spatio-temporal information including at least one of temporal prediction information from a current image and a recovered previous image, and spatial prediction information from a recovered current image. The recovered image processor performs a spatio-temporal noise removal process on the recovered current image using the spatio-temporal information, and stores the resulting noise-removed image. The residue generator generates a residue image obtained by subtracting the predicted image from the input image, and the quantizer outputs quantized coefficients by quantizing the residue image. The entropy encoder generates a bit stream by entropy coding the quantized coefficients.

21 Claims, 10 Drawing Sheets

APPARATUS AND METHOD FOR CODING AND DECODING IMAGE

CROSS-REFERENCE TO RELATED PATENT APPLICATION

This application claims the benefit of Korean Patent Application No. 10-2005-0084250, filed on Sep. 9, 2005, in the Korean Intellectual Property Office, the disclosure of which is incorporated herein in its entirety by reference.

BACKGROUND OF THE INVENTION

1. Field of the Invention

The present invention relates to image coding and decoding, and more particularly, to an apparatus and method for coding and decoding a digital image with an improved coding efficiency. The digital image includes noise such as a film grain component generated in an image when a movie film is digitized.

2. Description of the Related Art

Conventional coding of an image is performed through processes of performing spatio-temporal prediction, coding a RGB signal of a residue image obtained by subtracting a predicted image from an input image, transforming and quantizing the coded RGB signal, and generating a bit stream with respect to the transformed and quantized image.

In the coding of the image using spatio-temporal prediction, intra spatial predictive coding is used to predict a pixel value of a current block using a spatial correlation of the image. More specifically, the pixel value of the current block is predicted by calculating a difference value between the coded pixel value of an adjacent block and the pixel value of the current block. In inter temporal predictive coding an image is coded by subtracting a current image from a previous image.

Coding efficiency of a general image can be greatly improved by performing the spatial and temporal predictive coding processes with various kinds of methods in ISO/IEC MPEG established for coding of a high quality image and H.264/MPEG-4pt. 10 AVC FRExt standardization technology ("Fidelity range extensions amendment to ITU-T Rec. H.254|ISO/IEC 14496-10," ISO/IEC JTC1/SC29/WG11 and ITU-TSG16 Q.6, Document JVT-L047 (2004)) of Joint Video Team of ITU-T VCEG.

However, in coding of an image according to the prior art, the noise of the image is removed and then the image is coded to improve coding efficiency. In this case, the noise such as a film grain component is necessary information to give a cinematic effect in the image, and thus, if removed, the cinematic effect disappears.

Accordingly, technology is required to code and decode an image without removing noise such as the film grain component.

SUMMARY OF THE INVENTION

The present invention provides an apparatus and a method for coding and decoding an image, capable of providing a high coding efficiency without removing necessary noise components of the image.

According to an aspect of the present invention, there is provided an apparatus for coding an image, the apparatus including a spatio-temporal information prediction/compensation unit generating a predicted image by predicting and compensating spatio-temporal information including at least one of temporal prediction information from a current image and a recovered previous image, and spatial prediction information from a recovered current image, a recovered image processor performing a spatio-temporal noise removal process on the recovered current image using the spatio-temporal information, and storing a resulting noise-removed image, a residue generator generating a residue image obtained by subtracting a predicted image from the input image, a quantizer outputting quantized coefficients by quantizing the residue image, and an entropy encoder generating a bit stream by entropy coding the quantized coefficients. Additionally, the spatio-temporal information prediction/compensation unit predicts the spatio-temporal information using selectively one of the noise-removed image and the recovered current image.

The recovered image processor may include a noise-removed image storage unit storing the noise-removed image, a reference image storage unit storing the recovered current image as a reference image, a noise remover performing a noise removal process on the recovered current image using a previous reference image stored in the reference image storage unit and the spatio-temporal information, and an image selector selecting one of the noise-removed image storage unit and the reference image storage unit and inputting the selected image to the spatio-temporal information prediction/compensation unit.

The apparatus for coding the image may further include an image selection controller selecting an image with a better coding efficiency by calculating a bit rate and an image quality distortion using a coded result with respect to the noise-removed image and the reference image, respectively, and outputting an image selection signal to the image selector.

The noise remover may remove a spatial noise of the recovered current image using recovered pixel values spatially adjacent to a block of the recovered current image in an intra mode, and the noise remover may remove a temporal noise of the recovered current image using a movement compensated image of the recovered previous image in an inter mode.

The entropy encoder may generate a bit stream by entropy coding the quantized coefficients and the spatio-temporal prediction information together, The apparatus for coding the image may further include a spatial transform unit performing a frequency spatial transform on the residue image, and wherein the predicted image is generated using an image recovered by performing an inverse quantization and an inverse spatial transform on a signal, the signal being generated by performing a spatial transform and a quantization on the residue image generated by the residue generator.

According to another aspect of the present invention, there is provided a method for coding an image, the method including performing a spatio-temporal noise removal process on a recovered current image using spatio-temporal information including at least one of temporal prediction information from a current image and a recovered previous image, and spatial prediction information from the recovered current image, generating a predicted image by performing a spatio-temporal prediction and compensation process using selectively one of a resulting noise-removed image and the recovered current image, generating a residue image obtained by subtracting the predicted image from an input image, outputting quantized coefficients by quantizing the residue image, and generating a bit stream by entropy coding the quantized coefficients.

According to another aspect of the present invention, there is provided an apparatus for decoding an image, the apparatus including an entropy decoder outputting quantized coefficients of a residue image by performing entropy decoding on an inputted bit stream, an inverse quantizer recovering the residue image by performing quantization the quantized coefficients, a spatio-temporal information compensation unit generating a predicted image by compensating spatio-temporal prediction information including at least one of temporal prediction information from a recovered current image and a recovered previous image, and spatial prediction information from a recovered current image, a recovered image processor performing a spatio-temporal noise removal process using compensated spatio-temporal information, and storing a resulting noise-removed image, and a recovered image generator generating a recovered image by adding the residue image to the predicted image. Additionally, the spatio-temporal information compensation unit compensates spatio-temporal information using selectively one of the noise-removed image and the recovered current image.

According to another aspect of the present invention, there is provided a method for decoding an image, the method including outputting quantized coefficients of a residue image by entropy decoding an inputted bit stream, recovering the residue image by inversely quantizing the quantized coefficients, performing a spatio-temporal noise removal process on a recovered current image using spatio-temporal information including at least one of temporal prediction information from a current image and a recovered previous image, and spatial prediction information from the recovered current image, generating a predicted image by compensating spatio-temporal prediction information using selectively one of a resulting noise-removed image and the recovered current image, and generating a recovered image by adding the recovered residue image to the predicted image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
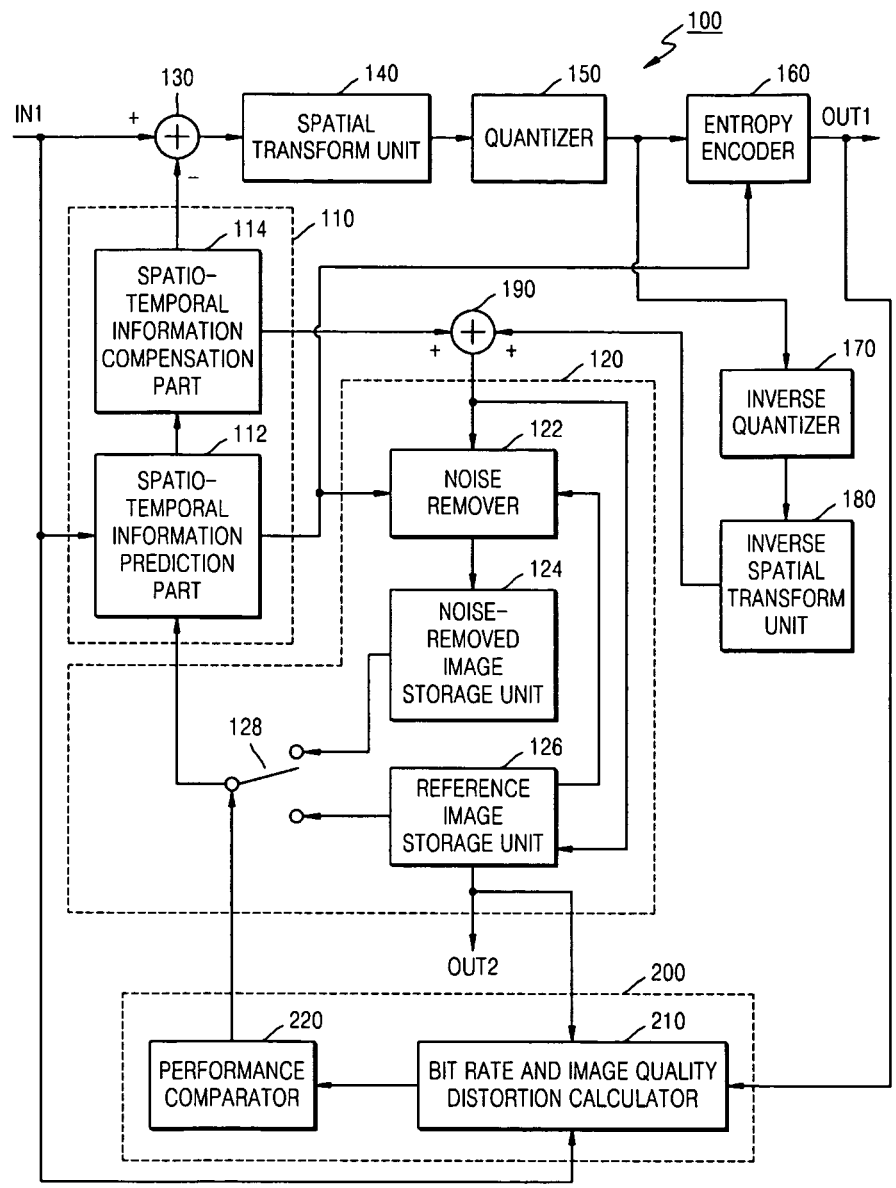
FIG. 1 is a block diagram illustrating a configuration of an apparatus for coding an image according to an embodiment of the present invention.
Figure 2A:
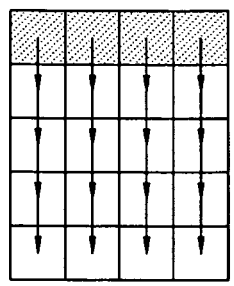
FIGS. 2A through 2I are diagrams for illustrating spatial prediction processes performed in a spatio-temporal prediction unit.
Figure 2B:
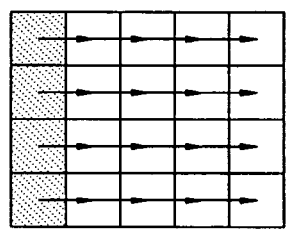
Figure 2C:
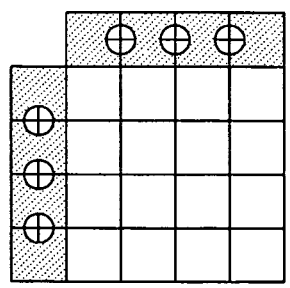
Figure 2D:
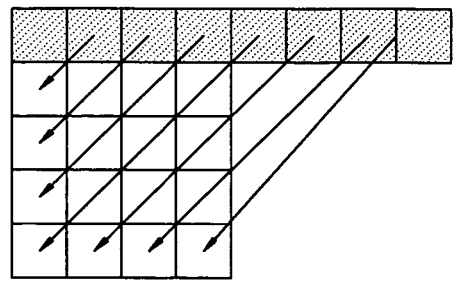
Figure 2E:
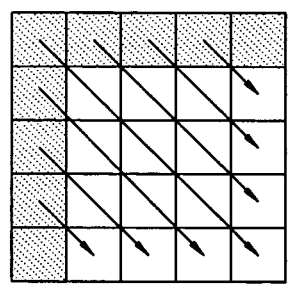
Figure 2F:
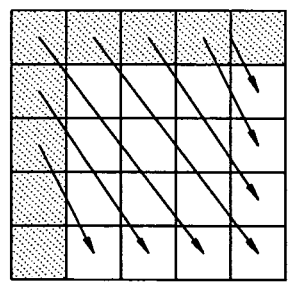
Figure 2G:
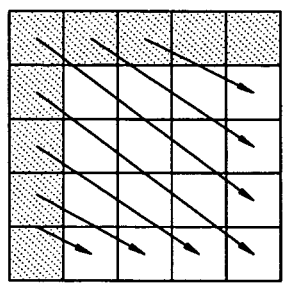
Figure 2H:
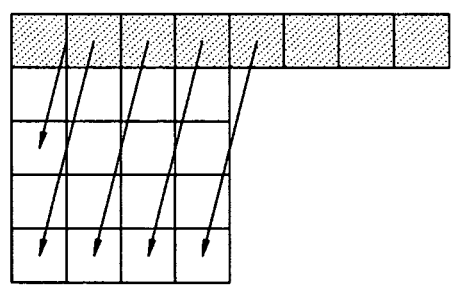
Figure 2I:
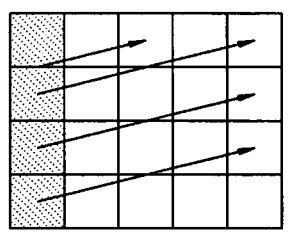

FIG. 1 is a block diagram illustrating a configuration of an apparatus 100 for coding an image according to an embodiment of the present invention. The apparatus 100 includes a spatio-temporal information prediction/compensation unit 110, a recovered image processor 120, a residue image generator 130, a spatial transform unit 140, a quantizer 150, an entropy encoder 160, an inverse quantizer 170, an inverse spatial transform unit 180, a recovered image generator 190, and an image selection controller 200.

The apparatus 100 divides an input image IN1 into a predetermined size of a block, and then codes the divided block unit. At this point, a unit of a standard unit, which is an object to be coded, is called a macro block.

The macro block used in the image decoding apparatus 100 includes a luminance Y component block and a chrominance (Cb or Cr) component block. For example, the luminance (Y) component block has 16 columns×16 rows of pixels, and the chrominance (Cb or Cr) component block has 8 columns×8 rows of pixels in a case of a macro block of a 4:2:0 format image.

It is desirable that the input image IN1 exists every time and can be various kinds of data with the passage of time. At this point, the input image IN1 can be image data expressed with red, green and blue components or with the luminance (Y) component and a chrominance (Cr or Cb) component. This input image IN1 has information of an image. Additionally, the input image is recovered by the recovered image generator 190 and the recovered image OUT2 can be displayed.

The apparatus 100 can code the input image according to an inter mode or an intra mode.

Here, the inter mode means that current image data is coded by estimating a movement of each block unit between a previous image frame and a current image frame. On the other hand, the intra mode means that a block is coded by considering coded blocks spatially adjacent to the block to be coded in a frame of the block.

In the inter mode, after a block, which is similar to the block to be coded currently, is extracted from among previous images recovered in the recovered image generator 190, the spatio-temporal information prediction/compensation unit 110 generates a predicted image by coding a difference between a pixel value of the extracted previous image and a pixel value of the current image, and also performing spatial prediction and compensation. When a first image is processed, the process is not performed because there is no previous image. On the other hand, in the intra mode, the spatio-temporal information prediction/compensation unit 110 generates a predicted image by performing the spatial prediction and the compensation on the pixel values of the current image using recovered pixel values spatially adjacent to a current image block. A spatial prediction method performed in the intra mode is illustrated in FIGS. 2A through 2I. This method is used in the standardization technology of ISO/IEC 14496 and ITU-T rec. H.264. The spatial prediction is performed in various directions using pixel values of a top row or a left column of the current block according to the nine different types of spatial prediction methods in FIGS. 2A through 2I.

The spatio-temporal information prediction/compensation unit 110 includes a spatio-temporal information prediction part 112 and a spatio-temporal information compensation part 114. A spatio-temporal information prediction part 112 predicts spatio-temporal information using one image selectively among recovered images stored in a reference image storage unit 126 and noise-removed images stored in a noise-removed image storage unit 124. When a spatio-temporal information prediction part 112 predicts spatio-temporal information using the noise-removed image, spatio-temporal information for noise component is predicted also. The spatio-temporal information compensation part 114 generates a predicted image by compensating the spatio-temporal information predicted in the spatio-temporal information prediction part 112.

The recovered image processor 120 performs a spatio-temporal noise removal process on a recovered current image using spatio-temporal information compensated in the spatio-temporal compensation part 114, and also includes a noise remover 122, a noise-removed image storage unit 124, a reference image storage unit 126, and an image selector 128.

The noise remover 122 performs a noise removal process on the recovered current image using a previous image stored in the reference image storage unit 126 and the spatio-temporal information. In the intra mode, the noise remover 122 performs a spatial noise removal of the recovered current image using a value of a recovered pixel spatially adjacent to the block of the recovered current image. Additionally, in the inter mode, the noise remover 122 performs a temporal noise removal of the recovered current image using a movement compensated image in the recovered previous image.

A noise-removed image storage unit 124 stores an image after noise of the image is removed in the noise remover 122. The reference image storage unit 126 stores the recovered current image. The image selector 128 selects one of the noise-removed image storage unit 124 and the reference image storage unit 126 and inputs the selected image to the spatio-temporal information prediction/compensation unit 110.

An operation of the noise remover 122 will be described in more detail with reference to FIGS. 3A through 3I.

The residue image generator 130 generates a residue image that is subtractel spatio-temporal predicted and compensated image from the input image IN1.

A spatial transform unit 140 performs an integer transform on the residue image and a frequency spatial transform (e.g., a discrete cosine transform, etc.). The quantizer 150 performs quantization on a transform coefficient provided from the spatial transform unit 140 and outputs a quantized coefficient.

The entropy encoder 160 generates a bit stream OUT1 by entropy coding coefficients quantized in the quantizer 150. When a bit stream is generated by entropy coding the quantized coefficient, the entropy encoder 160 generates a bit stream which is entropy coded by spatio-temporal prediction information such as a movement vector from the spatio-temporal information prediction/compensation unit 110. Thus, the entropy encoder 160 adds the generated bit stream to the bit stream of the quantized coefficient. When coding a bit stream of the quantized coefficient, the bit stream can be used as coding information because the bit stream of the spatio-temporal prediction information is added to the bit stream of the quantized coefficient. Additionally, the entropy encoder 160 adds image selection signal information, which selects one of the noise-removed image and a reference image, to the bit stream The inverse quantizer 170 performs an inverse quantizing process on the quantized coefficient in the quantizer 150, and also the inverse spatial transform unit 180 performs an inverse discrete cosine transform (IDCT) on the inverse quantized result and restores the residue image.

The recovered image generator 190 generates a recovered image by adding a predict image predicted in the spatio-temporal information compensation part 114 to the recovered residue image recovered in the inverse spatial transform unit 180, and then stores this recovered image in the reference image storage unit 126.

The image selection controller 200 selects an image with better coding efficiency by calculating each bit rate and each image quality distortion with respect to a noise-removed image and a reference image used in performing a spatio-temporal information prediction and compensation. The image selection controller 200 includes a bit rate and image quality distortion calculator 210 and a performance comparator 220.

The bit rate and image quality distortion calculator 210 calculates a bit rate from an entropy coding result after performing a spatial transform and quantization. Additionally, the bit rate and image quality distortion calculator 210 calculates an image quality distortion by averaging a sum of a square of a difference of pixel values between a recovered image and an input image as expressed in Equation 1.

$$D = \frac{1}{N}\sum_{i=0}^{N}(p_i - q_i)^2 \quad [\text{Equation 1}]$$

where D, p, q, i, N represent a degree of image distortion, a pixel value of a recovered image, a pixel value of an input image, an index of a pixel in a current block, and a number of pixels, respectively.

The performance comparator 220 compares performance using a well-known Lagrangian optimized method on the basis of a bit rate and an image quality distortion calculated for each of the noise-removed image and the reference image. At this point, the performance comparator 220 calculates a Lagrangian value, that is, criteria of the performance, from the bit rate and the image quality distortion using Equation 2.

$$L = D + \lambda R \quad [\text{Equation 2}]$$

where L, R, and λ represent a Lagrangian value, a bit rate, and a constant, respectively. Additionally a smaller Lagrangian value L indicates a better coding efficiency.

The performance comparator 220 selects a method having a smaller L value and outputs a selection result signal to the image selector 128. The selection result signal is operated as a switching signal of the image selector 128.

Additionally, the performance comparator 220 selects spatial prediction with a better coding efficiency by calculating the bit rate and the image quality distortion from each coding result for the nine different types of spatial predictions that will be mentioned later. In this case, the performance comparator 200 selects a spatial prediction having the smallest L value on the basis of Equations 1 and 2 with respect to the nine different types of spatial predictions.

FIGS. 3A through 3I are diagrams for illustrating spatial noise-removing filtering methods performed in a noise remover according to an embodiment of the present invention. The spatial noise-removing filtering methods are performed using the spatial prediction methods illustrated in FIGS. 2A through 2I. Additionally, the spatial noise-removing filtering methods in FIGS. 3A through 3I are performed using the following Equations 3 through 11, respectively. As described above, the filtering method with the most efficient coding is selected among the methods of the nine different types after the nine spatial noise-removing filtering methods are performed.

Figure 3A:
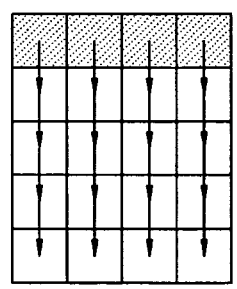
FIGS. 3A through 3I are diagrams for illustrating spatial noise-removing filtering processes performed in a noise remover.

As illustrated in FIG. 3A, a noise-removing filtering method in a vertical direction is performed using the following Equation 3.

$$f_{filt}(x, y) = \frac{w_1 \cdot f_{rec}(x, y) + w_2 f_{rec}(x, y-1) + (w_1 + w_2)/2}{w_1 + w_2} \quad [\text{Equation 3}]$$

$(w_1 \geq w_2, \text{ e.g., } w_1 = 7, w_2 = 1)$ where $w_1$ and $w_2$ represent weighted values determined by an experiment and the smoother the filtered image becomes as the size of $w_2$ increases. Additionally, $f_{rec}(x,y)$ and $f_{rec}(x,y-1)$ represent a pixel value of a recovered current image and a pixel value in a top row of a recovered current image, respectively. These values of $f_{rec}(x,y)$ and $f_{rec}(x,y-1)$ are identical in Equations 4 through 12.

Figure 3B:
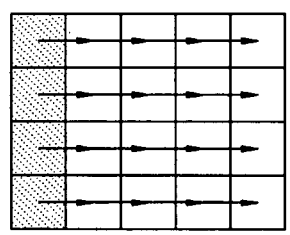

A noise-removing filtering method in a horizontal direction in FIG. 3B is performed using the following Equation 4.

$$f_{filt}(x, y) = \frac{w_1 \cdot f_{rec}(x, y) + w_2 f_{rec}(x-1, y) + (w_1+w_2)/2}{w_1 + w_2} \quad \text{[Equation 4]}$$

$(w_1 \geq w_2, \text{ e.g., } w_1 = 7, w_2 = 1)$

Figure 3C:
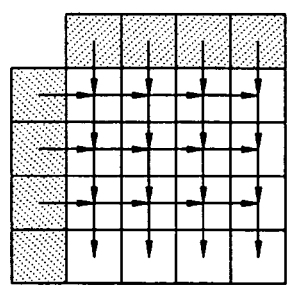

A noise-removing filtering method in a perpendicular direction in FIG. 3C is performed using the following Equation 5.

$$f_{filt}(x, y) = \frac{w_1 \cdot f_{rec}(x, y) + w_2 f_{rec}(x-1, y) + w_3 f_{rec}(x, y-1) + (w_1+w_2+w_3)/2}{w_1 + w_2 + w_3} \quad \text{[Equation 5]}$$

$(w_1 \geq w_2, w_1 \geq w_3, \text{ e.g., } w_1 = 6, w_2 = 1, w_3 = 1)$

Figure 3D:
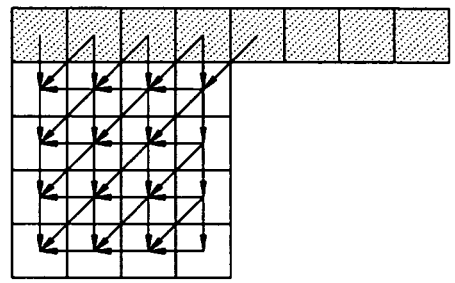

A noise-removing filtering method in a diagonal-down-left direction in FIG. 3D is performed using the following Equation 6.

$$f_{filt}(x, y) = \frac{w_1 \cdot f_{rec}(x, y) + w_2 f_{rec}(x, y-1) + w_3 f_{rec}(x+1, y-1) + w_4 f_{rec}(x+1, y) + (w_1+w_2+w_3+w_4)/2}{w_1 + w_2 + w_3 + w_4} \quad \text{[Equation 6]}$$

$(w_1 \geq w_2, w_1 \geq w_3, w_1 \geq w_4)$

Figure 3E:
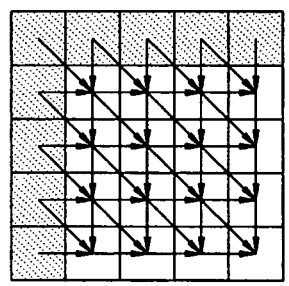

A noise-removing filtering method in a diagonal-down-right direction in FIG. 3E is performed using the following Equation 7.

$$f_{filt}(x, y) = \frac{w_1 \cdot f_{rec}(x, y) + w_2 f_{rec}(x-1, y-1) + w_3 f_{rec}(x, y-1) + w_4 f_{rec}(x-1, y) + (w_1+w_2+w_3+w_4)/2}{w_1 + w_2 + w_3 + w_4} \quad \text{[Equation 7]}$$

$(w_1 \geq w_2, w_1 \geq w_3, w_1 \geq w_4)$

Figure 3F:
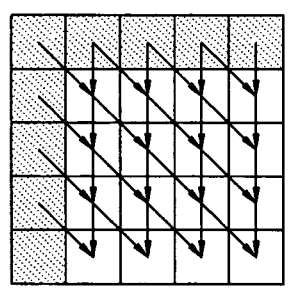

A noise-removing filtering method in a vertical-right direction in FIG. 3F is performed using the following Equation 8.

$$f_{filt}(x, y) = \frac{w_1 \cdot f_{rec}(x, y) + w_2 f_{rec}(x, y-1) + w_3 f_{rec}(x-1, y-1) + (w_1+w_2+w_3)/2}{w_1 + w_2 + w_3} \quad \text{[Equation 8]}$$

$(w_1 \geq w_2, w_1 \geq w_3, \text{ e.g., } w_1 = 6, w_2 = 1, w_3 = 1)$

Figure 3G:
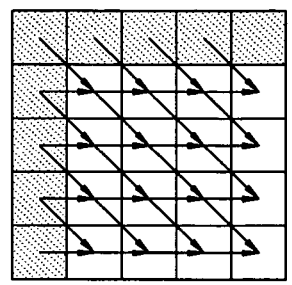

A noise-removing filtering method in a horizontal-down direction in FIG. 3G is performed using the following Equation 9.

$$f_{filt}(x, y) = \frac{w_1 \cdot f_{rec}(x, y) + w_2 f_{rec}(x-1, y) + w_3 f_{rec}(x-1, y-1) + (w_1+w_2+w_3)/2}{w_1 + w_2 + w_3} \quad \text{[Equation 9]}$$

$(w_1 \geq w_2, w_1 \geq w_3, \text{ e.g., } w_1 = 6, w_2 = 1, w_3 = 1)$

Figure 3H:
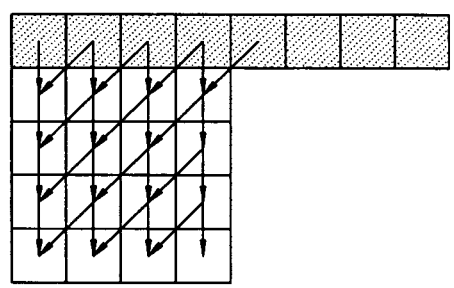

A noise-removing filtering method in a vertical-left direction in FIG. 3H is performed using the following Equation 10.

$$f_{filt}(x, y) = \frac{w_1 \cdot f_{rec}(x, y) + w_2 f_{rec}(x, y-1) + w_3 f_{rec}(x+1, y-1) + (w_1+w_2+w_3)/2}{w_1 + w_2 + w_3} \quad \text{[Equation 10]}$$

$(w_1 \geq w_2, w_1 \geq w_3, \text{ e.g., } w_1 = 6, w_2 = 1, w_3 = 1)$

Figure 3I:
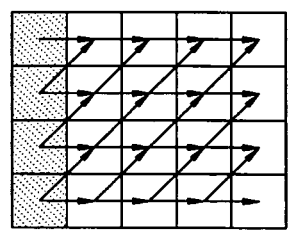

A noise-removing filtering method in a horizontal-up direction in FIG. 3I is performed using the following Equation 11.

$$f_{filt}(x, y) = \frac{w_1 \cdot f_{rec}(x, y) + w_2 f_{rec}(x-1, y) + w_3 f_{rec}(x-1, y+1) + (w_1+w_2+w_3)/2}{w_1 + w_2 + w_3} \quad \text{[Equation 11]}$$

$(w_1 \geq w_2, w_1 \geq w_3, \text{ e.g., } w_1 = 6, w_2 = 1, w_3 = 1)$

In the inter mode, the noise-removing filtering method in the noise remover of an apparatus for coding an image is performed using the following Equation 12.

$$f_{filt}(x, y) = \frac{w_1 \cdot f_{rec}(x, y, t) + w_2 f_{rec}(x-mvx, y-mvy, t-1) + (w_1+w_2)/2}{w_1 + w_2} \quad \text{[Equation 12]}$$

$(w_1 \geq w_2, \text{ e.g., } w_1 = 3, w_2 = 1)$ where $f_{rec}(x,y,t)$ represents a pixel value of a recovered current image, $f_{rec}(x-mvx,y-mvx,t)$ represents a pixel value of a movement compensated image in the previous image, and mvx and mvy represent a movement vector value of a vertical direction and a horizontal direction, respectively.

Figure 4:
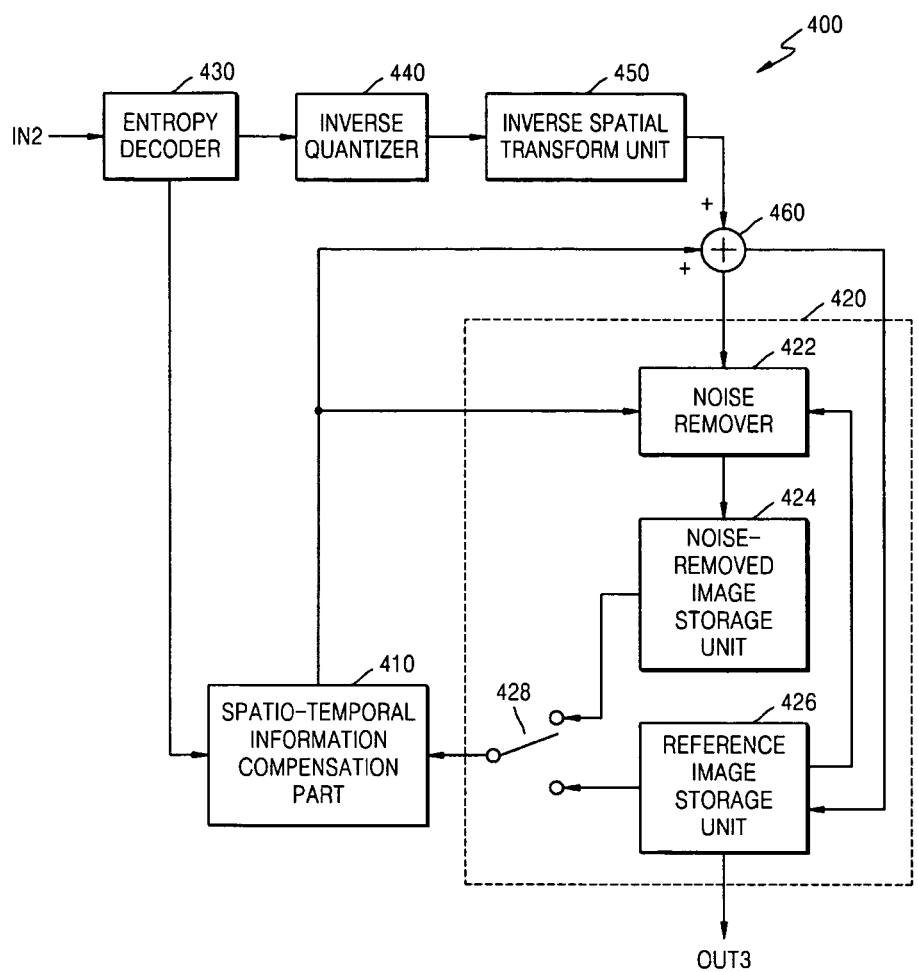
FIG. 4 is a block diagram illustrating a configuration of an apparatus for decoding an image according to an embodiment of the present invention.

FIG. 4 is a block diagram illustrating a configuration of an apparatus 400 for decoding an image according to an embodiment of the present invention. The apparatus 400 includes a spatio-temporal information compensation part 410, a recovered image processor 420, an entropy decoder 430, an inverse quantizer 440, an inverse spatial transform unit 450, and a recovered image generator 460.

A bit stream IN2 is a coded result using the image coding apparatus of the present invention, and represents OUT1 of the image coding apparatus of FIG. 1.

The spatio-temporal information compensation part 410 compensates spatio-temporal prediction information using an image outputted from the recovered image processor 420 and generates a predicted image.

The recovered image processor 420 performs a spatio-temporal noise removal method using the spatio-temporal information compensated in the spatio-temporal information compensation part 410 about the recovered current image, and also includes a noise remover 422, a noise-removed image storage unit 424, a reference image storage unit 426, and an image selector 428.

The noise remover 422 performs a noise removal method on the recovered current image using a previous image stored in the reference image storage unit 426 and the spatio-temporal information. A noise-removed image storage unit 424 stores a noise-removed image. The reference image storage unit 426 stores the recovered current image. The image selector 428 selects one of the noise-removed image storage unit 424 and the reference image storage unit 426 to input an image from the spatio-temporal information compensation part 410. Unlike the image selector 128 of the image coding apparatus 100, the image is selected and inputted according to the image selection information included in the input bit stream IN2.

Since the recovered image processor 420 operates in the same manner as the recovered image processor 120 of the apparatus for coding the image 100, a detailed description of the spatio-temporal noise filtering by the noise remover 422 will be omitted for conciseness.

Accordingly, the spatio-temporal information compensation part 410 compensates spatio-temporal information using one image selectively among recovered images stored in a reference image storage unit 426 and noise-removed images stored in a noise-removed image storage unit 424. Since a method of compensating the spatio-temporal information according to the intra mode or the inter mode is identical to that of the image coding apparatus, a detailed description thereof will be omitted.

The entropy decoder 430 decodes the quantized coefficients and the spatio-temporal prediction information for a residue image by decoding the inputted bit stream IN2. An inverse quantizer 440 inversely quantizes the quantized coefficient an integer transform and an inverse spatial transform, and also an inverse spatial transform unit 450 performs (such as inverse discrete cosine transform (IDCT), and restores the residue image.

The recovered image generator 460 generates a recovered image by adding a predict image predicted in the spatio-temporal information compensation unit 410 to the recovered residue image recovered in the inverse spatial transform unit 450, and then stores this recovered image in the reference image storage unit 426. The reference image storage unit 426 outputs the stored recovered image OUT3 to a display device (not shown).

Figure 5:
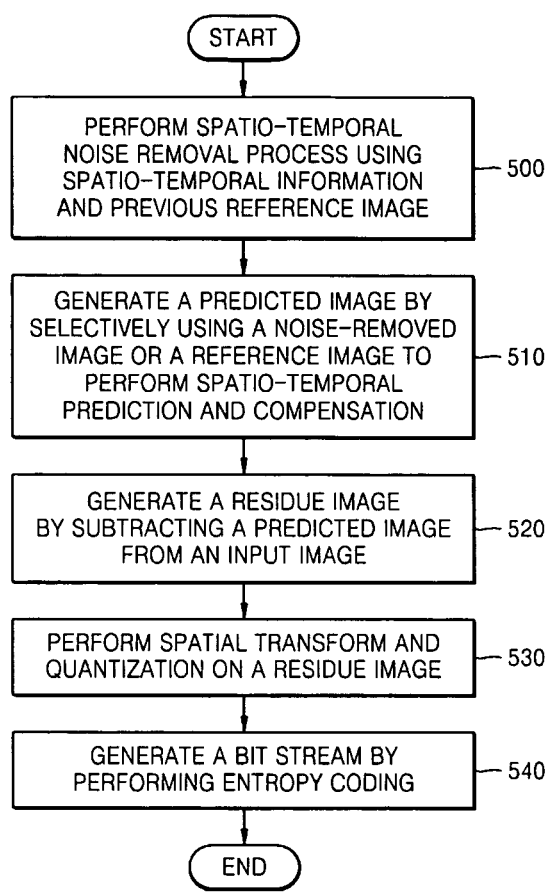
FIG. 5 is a flowchart illustrating a method of coding an image according to an embodiment of the present invention.

FIG. 5 is a flowchart illustrating a method of coding an image according to an embodiment of the present invention. The method of coding an image according to the current embodiment of the present invention will now be described in association with components of the image coding apparatus 100 of FIG. 1.

Referring to FIGS. 1 and 5, the noise remover 122 performs a spatio-temporal noise removal process using spatio-temporal information and a recovered reference image in operation S500. The spatio-temporal noise removal process in the intra mode is performed using one of the nine methods described by Equations 3 through 11. In the inter mode, the temporal noise removal process is performed using the method described by Equation 12. The noise remover 122 stores a noise-removed image in the noise-removed image storage unit 424.

The spatio-temporal information prediction/compensation unit 110 generates a predicted image by selectively using a noise-removed image or a reference image (a recovered image) to perform spatio-temporal prediction and compensation in operation S510.

The residue image generator 130 generates a residue image by subtracting a predicted image from an input image in operation S520.

A spatial transform unit 140 performs a spatial transform on the residue image and the quantizer 150 performs quantization on a transform coefficient provided from the spatial transform unit 140 in operation S530.

The entropy encoder 160 performs entropy coding on quantized coefficients outputted from the quantizer 150 and generates a bit stream in operation S540.

Figure 6:
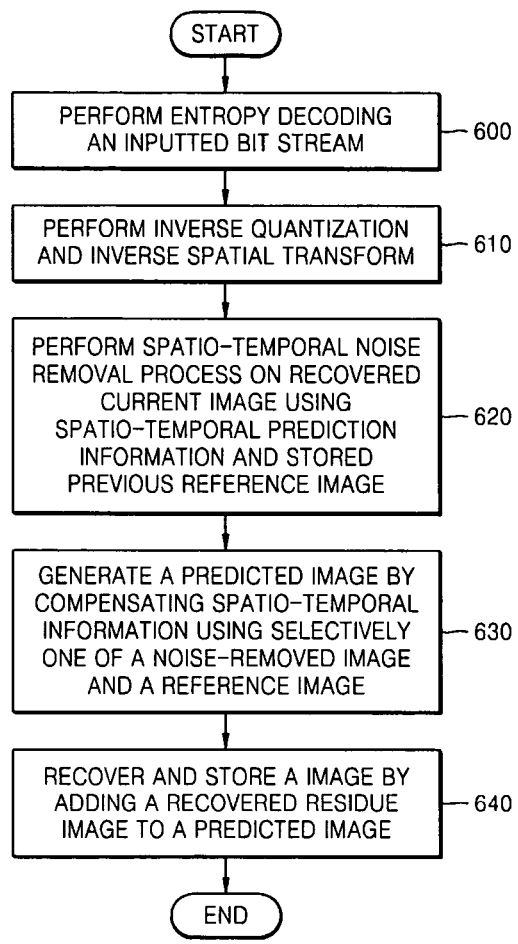
FIG. 6 is a flowchart illustrating a method of decoding an image according to an embodiment of the present invention.

FIG. 6 is a flowchart illustrating a method of decoding an image according to an embodiment of the present invention and will be described in association with components of the image decoding apparatus illustrated in FIG. 4.

Referring to FIGS. 4 and 6, the entropy decoder 430 decodes quantized coefficients of a residue image by entropy decoding an inputted bit stream in operation S600. At this point, since the inputted bit stream includes spatio-temporal prediction information, the spatio-temporal prediction information is recovered after entropy decoding the inputted bit stream.

The inverse quantizer 440 inversely quantizes the quantized coefficients and also the inverse spatial transform unit 450 performs an inverse spatial transform on the inverse quantized result and restores the residue image in operation S610.

The noise remover 422 removes spatio-temporal noise from the current image recovered from the recovered image generator 460 using the spatio-temporal prediction information and the previous reference image in operation S620. The spatio-temporal prediction information is inputted from the entropy decoder 430 and the previous reference image is an image stored in the reference image storage unit 426.

The spatio-temporal information compensation part 410 generates a predicted image by selectively using the resulting noise-removed image or the reference image to compensate the spatio-temporal information in operation S630.

The recovered image generator 460 generates a recovered image by adding the recovered residue image to the predicted image from the spatio-temporal information compensation part 410 and then stores the recovered image in the reference image storage unit in operation S640.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

According to the present invention, when coding and decoding the image, a high coding and decoding efficiency can be achieved without removing necessary noise components of the image by selecting one of a noise-removed image and a recovered image to perform a spatio-temporal information prediction and compensation process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for coding an image, the apparatus comprising:
   a spatio-temporal information prediction/compensation unit generating a predicted image by predicting and compensating spatio-temporal information comprising temporal prediction information from a current image and a recovered image, and spatial prediction information from the current image;
   a recovered image processor performing a spatio-temporal noise removal process on the recovered image using the spatio-temporal information, and storing a resulting noise-removed image;
   a residue generator generating a residue image obtained by subtracting the predicted image from the current image;
   a quantizer outputting quantized coefficients by quantizing the residue image; and
   an entropy encoder generating a bit stream by entropy coding the quantized coefficients,
   wherein the spatio-temporal information prediction/compensation unit predicts the spatio-temporal information using selectively one of the noise-removed image and the recovered image, wherein the entropy encoder adds image selection signal information, which selects one of the noise-removed image and the recovered image, to the bit stream,
   wherein the recovered image processor comprises:
   a noise-removed image storage unit storing the noise-removed image;
   a reference image storage unit storing the recovered image as a reference image;
   a noise remover performing a noise removal process on the recovered image using a previous reference image stored in the reference image storage unit and the spatio-temporal information from the spatio-temporal information prediction/compensation unit; and
   an image selector selecting one of the noise-removed image storage unit and the reference image storage unit and inputting the selected image to the spatio-temporal information prediction/compensation unit.

2. The apparatus of claim 1, further comprising an image selection controller selecting an image with a better coding efficiency by calculating a bit rate and an image quality distortion using a coded result with respect to the noise-removed image and the reference image, respectively, and outputting an image selection signal to the image selector.

3. The apparatus of claim 2, wherein the image quality distortion is calculated by averaging a sum of a square of a difference of pixel values between the reference image and the input image.

4. The apparatus of claim 1, wherein the noise remover removes a spatial noise of the recovered image using recovered pixel values spatially adjacent to a block of the recovered image in an intra mode.

5. The apparatus of claim 1, wherein the noise remover removes a temporal noise of the recovered image using a movement compensated image of the recovered image in an inter mode.

6. The apparatus of claim 1, wherein the entropy encoder generates a bit stream by entropy coding the quantized coefficients and the spatio-temporal prediction information together.

7. The apparatus of claim 1, further comprising a spatial transform unit performing a frequency spatial transform on the residue image, wherein the predicted image is generated using an image recovered by performing an inverse quantization process and an inverse spatial transform on a signal, the signal being generated by performing a spatial transform and a quantization on the residue image generated by the residue generator.

8. The apparatus of claim 1, wherein the recovered image is generated by adding the predicted image and a recovered residue image.

9. A method of coding an image, the method comprising:
   performing a spatio-temporal noise removal process on a recovered image using spatio-temporal information comprising temporal prediction information from a current image and a recovered image, and spatial prediction information from the current image;
   generating a predicted image by performing a spatio-temporal prediction and compensation process using selectively one of a resulting noise-removed image and the recovered image, by adding image selection signal information, which selects one of the noise-removed image and the recovered image, to the bit stream;
   generating a residue image obtained by subtracting the predicted image from the current image;
   outputting quantized coefficients by quantizing the residue image; and
   generating a bit stream by entropy coding the quantized coefficients,
   wherein the performing of the spatio-temporal noise removal process comprises:
   performing a noise removal process on the recovered image using a previous reference image stored in a reference image storage unit and the spatio-temporal information from a spatio-temporal information prediction/compensation unit; and
   selecting one of the noise-removed image stored in a noise-removed image storage unit and the reference image stored in the reference image storage unit and inputting the selected image to the spatio-temporal information prediction/compensation unit.

10. The method of claim 9, wherein the performing of the spatio-temporal noise removal process comprises removing a spatial noise of the recovered image using recovered pixel values spatially adjacent to a block of the recovered image in an intra mode.

11. The method of claim 9, wherein the performing of the noise removal process comprises removing a temporal noise of the recovered image using a movement compensated image of the recovered image in an inter mode.

12. The method of claim 9, wherein the generating of the bit stream comprises generating a bit stream by entropy coding the quantized coefficients and the spatio-temporal prediction information together.

13. The method of claim 9, further comprising performing a frequency spatial transform on the residue image, wherein the predicted image is generated using an image recovered by performing an inverse quantization process and an inverse spatial transform on a signal, the signal being generated by performing a spatial transform and a quantization process on the residue image.

14. An apparatus for decoding an image, the apparatus comprising:
   an entropy decoder outputting quantized coefficients of a residue image by entropy decoding an input bit stream;
   an inverse quantizer recovering the residue image by inversely quantizing the quantized coefficients;
   a spatio-temporal information compensation unit generating a predicted image by compensating spatio-temporal prediction information comprising temporal prediction information from a recovered current image and a recovered previous image, and spatial prediction information from the recovered current image;

a recovered image processor performing a spatio-temporal noise removal process using compensated spatio-temporal information, and storing a resulting noise-removed image; and a recovered image generator generating a recovered image by adding the residue image to the predicted image;

wherein the spatio-temporal information compensation unit compensates spatio-temporal information using selectively one of the noise-removed image and the recovered current image, based on image selection signal information, which selects one of the noise-removed image and the recovered current image, included in the input bit stream, wherein the recovered image processor comprises:

a noise-removed image storage unit storing the noise-removed image;

a reference image storage unit storing the recovered current image as a reference image;

a noise remover performing a noise removal process on the recovered current image using a previous reference image stored in the reference image storage unit and the spatio-temporal information from the spatio-temporal information compensation unit; and an image selector selecting one of the noise-removed image storage unit and the reference image storage unit, and inputting the selected image to the spatio-temporal information compensation part.

15. The apparatus of claim 14, wherein the noise remover removes a spatial noise of the recovered current image using recovered pixel values spatially adjacent to a block of the recovered current image in an intra mode.

16. The apparatus of claim 14, wherein the noise remover removes a temporal noise of the recovered current image using a movement compensated image of the recovered previous image in an inter mode.

17. A method of decoding an image, the method comprising:

outputting quantized coefficients of a residue image by entropy decoding an input bit stream;

recovering the residue image by inversely quantizing the quantized coefficients;

performing a spatio-temporal noise removal process on a recovered current image using spatio-temporal information comprising temporal prediction information from a current image and a recovered previous image, and spatial prediction information from the recovered current image;

generating a predicted image by compensating spatio-temporal prediction information using selectively one of a resulting noise-removed image and the recovered current image, based on image selection signal information, which selects one of the noise-removed image and the recovered current image, included in the input bit stream; and generating a recovered image by adding a recovered residue image to the predicted image, wherein the performing of the spatio-temporal noise removal process comprises:

performing a noise removal process on the recovered image using a previous reference image stored in a reference image storage unit and the spatio-temporal information from a spatio-temporal information prediction/compensation unit; and selecting one of the noise-removed image stored in a noise-removed image storage unit and the reference image stored in the reference image storage unit and inputting the selected image to the spatio-temporal information prediction/compensation unit.

18. The method of claim 17, wherein the performing of the spatio-temporal noise removal process comprises removing a spatial noise of the recovered current image using recovered pixel values spatially adjacent to a block of the recovered current image in an intra mode.

19. The method of claim 17, wherein the performing of the spatio-temporal noise removal process comprises removing a temporal noise of the recovered current image using a movement compensated image of the recovered previous image in an inter mode.

20. A non-transitory computer-readable recording medium recording a program that executes a method for coding an image in a computer, the method comprising:

performing a spatio-temporal noise removal process on a recovered image using spatio-temporal information comprising temporal prediction information from a current image and a recovered image, and spatial prediction information from the current image;

generating a predicted image by performing a spatio-temporal prediction and compensation process using selectively one of the noise-removed image and the recovered image, by adding image selection signal information, which selects one of the noise-removed image and the recovered image, to the bit stream;

generating a residue image obtained by subtracting the predicted image from the current image;

outputting quantized coefficients by quantizing the residue image; and generating a bit stream by entropy coding the quantized coefficients, wherein the performing of the spatio-temporal noise removal process comprises:

performing a noise removal process on the recovered image using a previous reference image stored in a reference image storage unit and the spatio-temporal information from a spatio-temporal information prediction/compensation unit; and selecting one of the noise-removed image stored in a noise-removed image storage unit and the reference image stored in the reference image storage unit and inputting the selected image to the spatio-temporal information prediction/compensation unit.

21. A non-transitory computer-readable recording medium recording a program that executes a method of decoding an image in a computer, the method comprising:

outputting quantized coefficients of a residue image by entropy decoding an input bit stream;

recovering the residue image by inversely quantizing the quantized coefficients;

performing a spatio-temporal noise removal process on a recovered current image using spatio-temporal information comprising temporal prediction information from a current image and a recovered previous image, and spatial prediction information from the recovered current image;

generating a predicted image by compensating spatio-temporal prediction information using selectively one of a resulting noise-removed image and the recovered current image, based on image selection signal information, which selects one of the noise-removed image and the recovered current image, included in the input bit stream; and generating a recovered image by adding the recovered residue image to the predicted image, wherein the performing of the spatio-temporal noise removal process comprises:

performing a noise removal process on the recovered image using a previous reference image stored in a reference image storage unit and the spatio-temporal information from a spatio-temporal information prediction/compensation unit; and selecting one of the noise-removed image stored in a noise-removed image storage unit and the reference image stored in the reference image storage unit and inputting the selected image to the spatio-temporal information prediction/compensation unit.

* * * * *